Feb. 17, 1970  P. NIEDNER ET AL  3,495,949
DEVICE FOR MIXING GASES, LIQUIDS OR FINELY GRAINED SOLIDS
WITH A CARRIER GAS AND FOR THE MANUFACTURE
OF REACTION PRODUCTS
Filed Aug. 29, 1966  2 Sheets-Sheet 1

INVENTORS
PETER NIEDNER
GERHARD DIEZ
HEINZ THUBEAUVILLE

BY H. Edward Western

Feb. 17, 1970  P. NIEDNER ET AL  3,495,949
DEVICE FOR MIXING GASES, LIQUIDS OR FINELY GRAINED SOLIDS
WITH A CARRIER GAS AND FOR THE MANUFACTURE
OF REACTION PRODUCTS

Filed Aug. 29, 1966  2 Sheets-Sheet 2

INVENTORS
PETER NIEDNER
GERHARD DIEZ
HEINZ THUBEAUVILLE

BY *H. Edward Western*

3,495,949
DEVICE FOR MIXING GASES, LIQUIDS OR FINELY GRAINED SOLIDS WITH A CARRIER GAS AND FOR THE MANUFACTURE OF REACTION PRODUCTS
Peter Niedner, Muhlenstrasse 104, Bendorf; Gerhard Diez, Koblenz-Olperstrasse 21, Berndorf-Sayn; and Heinz Thubeauville, Roomersheide 104, Bochum, all of Germany
Filed Aug. 29, 1966, Ser. No. 576,507
Claims priority, application Germany, Aug. 28, 1965, O 11,087
Int. Cl. B01f 3/02, 3/04, 3/06
U.S. Cl. 23—284                                       4 Claims

ABSTRACT OF THE DISCLOSURE

An apparatus for the treatment of a substance with a carrier gas has a chamber with a bottom that is flat or dished and that leads to an upwardly inwardly tapering conical portion that terminates in a straight walled top portion; and is provided with a carrier gas inlet, the cross section of which substantially is from .06 to .4 times the largest cross section of the chamber, and the chamber wall that surrounds the inlet forms an angle of from substantially 60° to 120° with the axis of symmetry of the chamber, and means for imparting high kinetic energy to the carrier gas upon entry into the chamber.

---

The invention relates to a device for mixing of gaseous, liquid or finely grained solid substances with a carrier gas and for the manufacture of reaction products of one or more such substances; also for the change of the physical state of one or more substances in which the carrier gas participates. The carrier gas thereby is introduced into an axially symmetrical mixing or reaction chamber, respectively, while given a twist or spin, and the substances are introduced simultaneously and are mixed or reacted in a zone of high turbulence. The latter is attained by suitably conducting the gas. The gases and substances leave the chamber at the opposite end from the gas entrance in axial or tangential flow.

Reactors for carrying out processes, requiring intimate mixing of the reactants are known. A carrier gas frequently is employed which, e.g., in thermic processes, facilitates supply or removal of energy or which partly or entirely acts as reactant. examples for reactions of the later type are combustions.

Examples of reactors wherein the carrier gas acts as transport medium for the energy are fluid bed reactors or spray driers. Therein the carrier gas also removes moisture obtained from the substances.

However, reactors of this kind have drawbacks which severely limit their applicability. For instance, a heat treatment of finely grained solids is not feasible in fluid bed reactors when these solids pass through a melting zone. Lump formation is likely to occur thereby, as is the case, e.g., in the refining of iron sulfate-heptahydrate. Spray driers used for the separation of substances such as wash powders (soap or detergent powders) or of dried milk which had been dissolved or emulsified in liquids require long dwelling times in the drier and therefore large volumes for complete treatment. Long dwelling times ensue from the relatively slight turbulence between heat carrier and the substances to be treated. The danger that partially treated particles reach the drier walls and cake on these walls necessitates a much larger volume of the drier than theoretically corresponds to the dwelling time. Moreover, this large volume inhibits the application of high temperatures which accelerate reactions.

It is one object of the invention to intensify the mixing operation and thereby to accelerate the exchange of substances or the heat exchange, respectively, when a gas is the energy carrier. The salient feature is the creation of high turbulence in a mixing chamber.

Experiments have shown that a particularly intensive turbulence zone can be created by conducting two parallel gas streams in such a manner that they pass each other at substantially equal speed but in opposite direction. This had previously been utilized in a mixing chamber wherein, e.g., a gas stream is carried with a twist into a chamber which enlarges in the direction of the principal stream in such a manner that this gas stream follows the wall, reverses near the outlet and flows back in the area of the axis of the chamber. A zone of high turbulence is to form between the principal and the return flow wherein the substances are to be mixed. Such a turbulence zone actually can be attained. However, it has been found that this zone is very narrow, and it has further been established that some of the particles, introduced axially into the chamber, penetrate this turbulence zone, impinge on the walls prior to completion of the reaction and adhere thereto. In the course of the reaction, the steady supply of the substances leads to increasing incrustation, so that the operation must be interrupted and the chamber cleaned. Examples for this phenomenon are found upon drying, with splitting off of water of crystallization, of iron sulfate or iron chlorides. Similarly unsatisfactory results are obtained with experiments in which a salt solution is sprayed into the chamber for the purpose of separating solids by evaporation of the liquid component.

It is another object of the invention to eliminate these disadvantages since is surprisingly has been found that this can be effected with mixing chambers equipped and operated in such a manner that the carrier gas is introduced into one end of the chamber within the area of the rotational axis with high kinetic energy, radially expanded along the wall under the influence of centrifugal force, diverted in the form of an opening spiral, then redirected in the direction of the chamber outlet and conducted to the outlet in spirally coaxial movement along the wall of the chamber which conically tapers. The substances to be treated are fed into the chamber within the rotational axis of the mixing chamber either in the direction of the principal stream or in opposition thereto.

The invention now will be further explained with reference to the accompanying drawings. However, it should be understood that these are given merely by way of illustration, and not of limitation, and that numerous changes may be made in the details without departing from the spirit and the scope of the invention as hereinafter claimed.

In the drawings, all of which are schematics,

Figure 1:
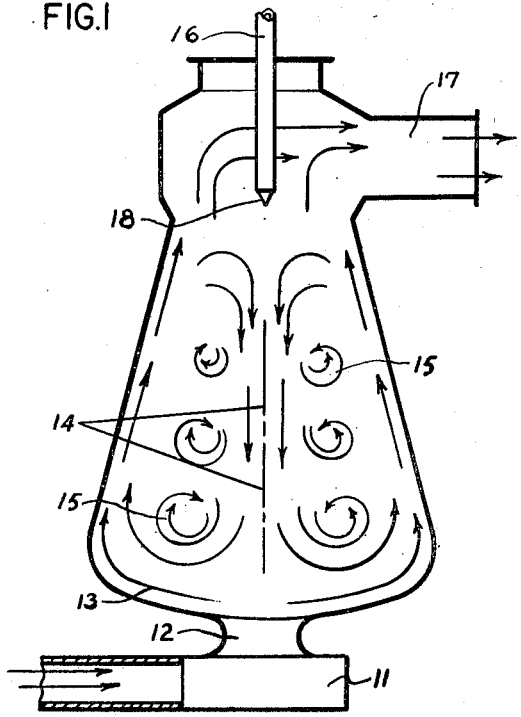
FIG. 1 is an elevational view of the device according to the invention.

Referring now to these drawings, the carrier gas is introduced into the axially symmetrical chamber shown in FIG. 1 rotating with the high kinetic energy within the area of the rotational axis of the chamber. The inlet for the carrier gas is located at 12 and the provisions for creating the twist or spin of the gas are disposed at 11. These provisions are of the conventional kind and are not shown per se in the drawings. They might consist of guide vanes, an entrance spiral, or the like. After the gas has passed the inlet 12 it suddenly is expanded under the influence of the centrifugal force and flows radially into the area 13 in the form of an opening spiral. The gas is deflected, after passing a given path length, in the direction of the rotational axis and flows spirally and coaxially to the axis of the chamber in the direction of the chamber outlet 17 through a conically tapering area of the chamber.

Figure 2:
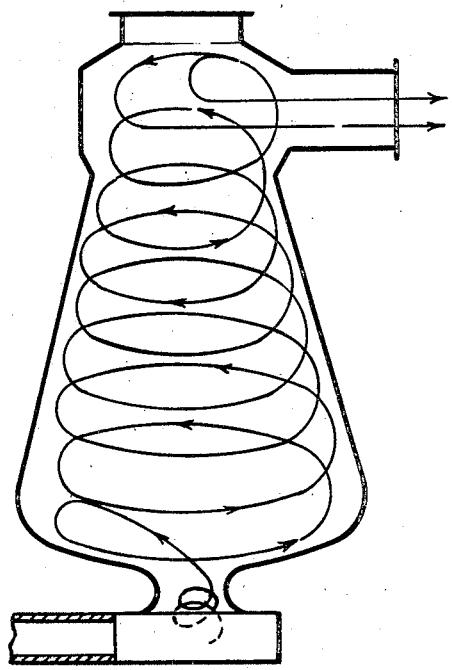
FIG. 2 is a similar view as shown in FIG. 1 showing a diverted spiral gas flow therein.

The ensuing spiral flow of the gas is illustrated in FIG. 2.

The radial expansion of the carrier gas under the influence of the centrifugal force, as mentioned, creates, within the area of the rotational axis 14, a zone of diminished pressure, the same as results in the stream about a radial compressor or a centrifugal pump. This zone of reduced pressure effects a partial reversal of the gas stream before it leaves the chamber and a backflow against the principal flow within the area of the rotational axis 14. Between the principal stream near the wall and the backflow, an extensive zone 15 forms which exhibits intensive turbulence wherein very intimate mixing of carrier gas and the substances to be treated or the intended reaction, respectively, occurs. The substance to be treated enters the chamber through conduit 16 which, in the case of the introduction of a liquid, may be provided with a nozzle 18. The high turbulence of the carrier gas precludes contact of the substances with the chamber wall at any time.

Figure 3:
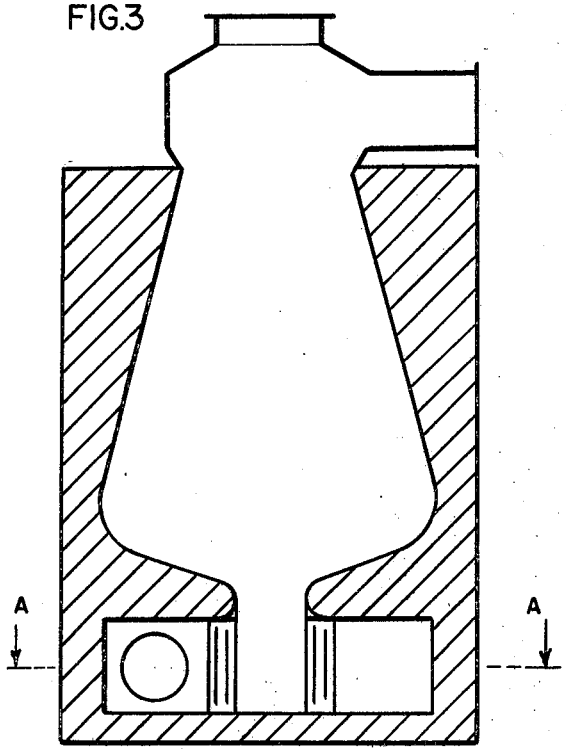
FIG. 3 is a sectional view of an embodiment with built-in gas producer.
Figure 3A:
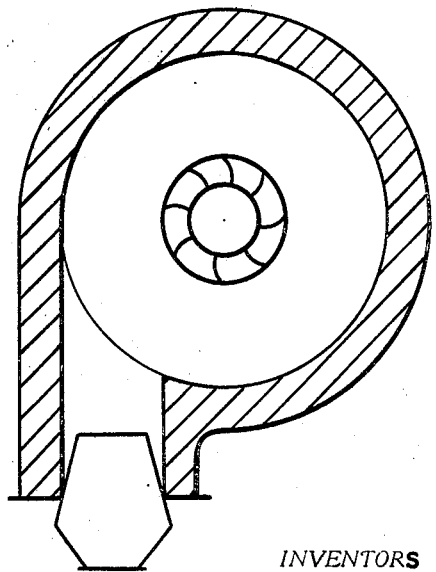
FIG. 3(A) is a view taken along lines A—A of FIG. 3.

FIGS. 3 and 3(A) show an arrangement for simultaneous production of the gas which is to serve as carrier from liquid or gaseous fuels. A ring chamber is provided below the reactor for the combustion which is fired tangentially in such a manner that the hot gas stream, prior to its entry into the devices providing rotation, obtains a twist or spin in the same direction. By suitable shaping of the ring chamber and synchronization with the cross section of the reactor inlet, the special twisting devices, such as guide vanes, spirals, bends, or the like, can be dispensed with entirely.

Figure 4:
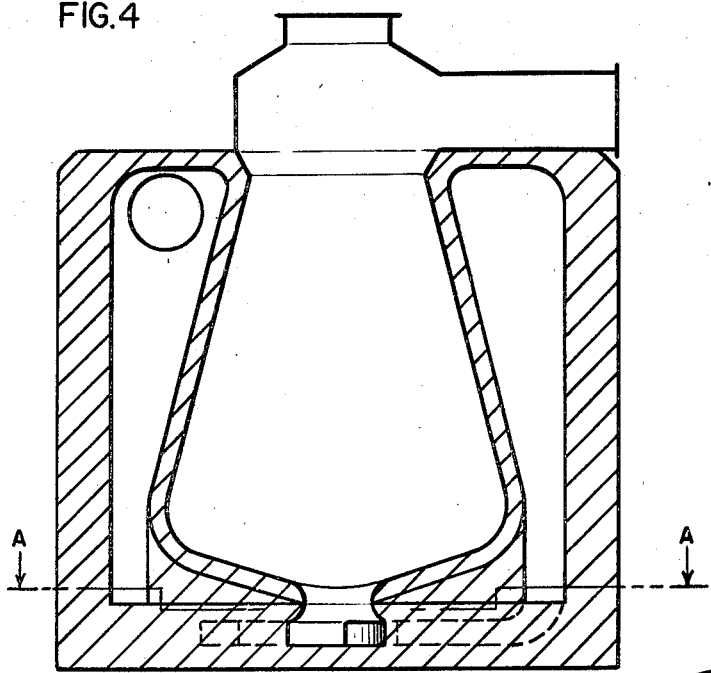
FIG. 4 is a sectional view of another embodiment showing a concentrical ring burner.
Figure 4A:
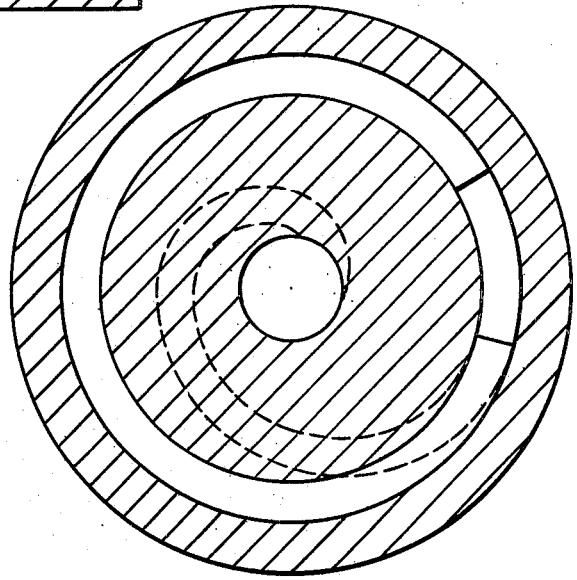
FIG. 4(A) is a view of FIG. 4 taken along lines A—A thereof.

The arrangement in accordanace with FIGS. 4 and 4(A) show a combustion chamber which is disposed concentrically with the reactor in the form of a ring chamber. Aside from the advantages described in connection with FIGS. 3 and 3(A), this disposition of reactor and combustion chamber facilities not only lower height of the entire unit but also the combination of a common wall between combustion chamber and reaction space. For reactions which can be carried out at temperatures above 1,000° C., this embodiment is useful from a heat-economical point of view. However, the particular advantage of this embodiment is to be found in the feature whereby the heat flow proceeds from the combustion chamber through the common wall with the reactor into the reactor's interior whereby a certain amount of heat radiation from the reactor wall into the reactor space influences the course of the reaction in a surprisingly favorable manner.

Figure 5:
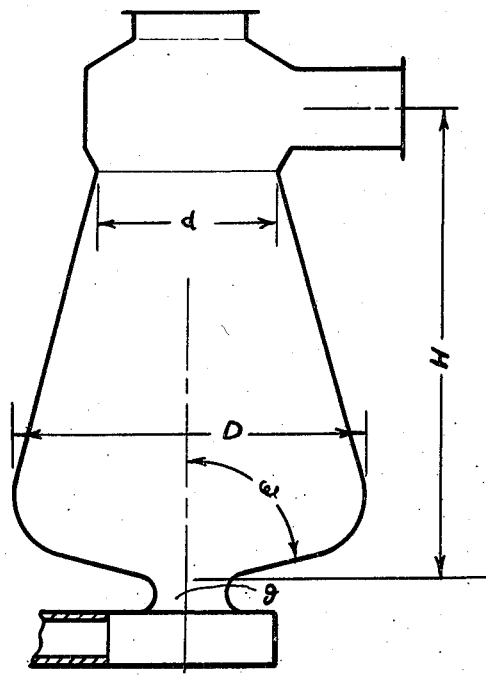

For the measurement proportions of the mixing and reaction chamber, certain ranges have been established as particularly advantageous. These are shown in FIG. 5, as follows:

The largest cross section D opportunely is 1.4 to 3 times that of the smallest cross section $d$. The smallest cross section $d$ is to be in the area of the chamber outlet. The effective height H of the chamber is to be 1.5 to 3.2 times as large as the smallest cross section $d$. The inlet cross section $q$ preferably is 0.06 to 0.4 times the chamber cross section; and the chamber wall surrounding the inlet cross section is to form an angle $\omega$ with the rotational axis which is between 60 and 120°.

The substance or heat exchange values obtained by means of the high turbulences enable high performance at small dimensions of the device. The volume of the apparatus according to the invention can be as little $\frac{1}{100}$ of that of a conventional spray evaporator, for instance. Because the surfaces also are comparatively small, heat losses are considerably lowered. Moreover, small dimensions save construction costs and permit the use of materials which facilitate reactions at such temperatures which had not been feasible on a production scale with conventional equipment.

In the treatment of liquids which are introduced into the chamber by way of a nozzle, as shown as 18 in FIG. 1, it has been found that the drops are torn steadily diminishing into streaks or schlieren in the zone of high turbulence so that they attain a drop size upon the start of the actual reaction which is much smaller than those attained with conventional nozzles. Consequently, very large surface per unit of substance and, hence, an unexpectedly high reaction speed are obtained. Whereas in a conventional spray process the end product is a hollow sphere or a half-moon shape, the process in the chamber according to the invention leads to finely linked, surface-active structures. This facilitates in the ensuing separation of solids from the gas unexpectedly high separation yields in conventional cyclones.

The field of application primarily is that of thermic processes. Experiments have shown that the temperature imparted to a particle of the substance largely corresponds to the exit temperature of the gas from the reactor. This enables adjustment and control of a given reaction temperature with simple means. This is particularly significant for the execution of reactions whose minimum and maximum temperatures are within narrow limits. No local overheating has been observed, due to the high turbulence.

Examples for thermic processes which can successfully be carried out in the reactor according to the invention are, among others, (1) drying of iron sulfate-hydrates with splitting off of water of crystallization, which is a process wherein the substance passes through a melting zone; (2) the evaporation of sulfuric acid solutions containing iron sulfate for the purpose of separating dry iron sulfate, a process which requires the maintenance of minimum and maximum temperatures within a narrow range; (3) the evaporation of metal chloride-containing acid solutions with simultaneous thermic reaction of the metal chlorides to metal oxides and HCl gas; and (4) the thermic decomposition of crystalline iron sulfate to iron oxides, sulfur oxides and steam.

However, these applications are merely examples, and other processes can readily be carried out in the device according to the invention.

We claim as our invention:

1. A device for the treatment of at least one substance selected from the group consisting of gases, liquids and finely grained solids with a carrier gas which comprises an axially symmetrical chamber having a bottom ranging from flat to slightly dished and an upwardly inwardly tapering conical side wall with a straightwalled top portion; a carrier gas inlet substantially at the bottom of said chamber; means for imparting high kinetic energy to said gas upon entry into said chamber, said means facilitating radial expansion of said gas and, together with the action of said conical sidewall, effecting diversion under the influence of centrifugal force to form an opening spiral in its travel thereby creating a zone of reduced pressure in the center portion of said chamber and thus an area of high turbulence, a part of said gas flowing back and mixing with newly entered gas; means for introducing said substance from the top of said chamber into said area of high turbulence; and outlet means for the substance thus treated and part of the carrier gas near the top of said chamber, the cross section of said carrier gas inlet being substantially from .06 to .4 times the largest cross section of the chamber; and the chamber wall surrounding said inlet forming an angle of from substantially 60° to 120° with the axis of said chamber.

2. The device as defined in claim 1 wherein said means for introducing said substance, in the instance of a liquid, is a conduit, and a nozzle at the lower end thereof; conduit and nozzle being disposed substantially in the axis of said chamber; said liquid, passing said nozzle and entering said area of high turbulence, attaining the form of extremely fine drops.

3. The device as defined in claim 1, wherein said chamber has dimensions whereby the largest cross section is substantially 1.4 to 3 times as large as the smallest cross section; and the inside height is substantially 1.5 to 3.2 times the smallest cross section.

4. The device as defined in claim 1, wherein said means for imparting high energy and for imparting a twist to said carrier gas is a combustion chamber concentrically annularly disposed throughout the height of said chamber and having a common wall therewith.

References Cited
UNITED STATES PATENTS
2,659,587 11/1953 Bowen _____ 34—57 XR
3,140,862 7/1964 Schoppe _____ 263—21

FOREIGN PATENTS
1,064,920 9/1959 Germany.

JAMES H. TAYMAN, Jr., Primary Examiner

U.S. Cl. X.R.

23—1, 288; 34—10, 57; 48—223; 110—28; 159—4; 263—21